No. 870,254.
PATENTED NOV. 5, 1907.
W. E. SLATER.
SHOCK ABSORBER.
APPLICATION FILED MAY 31, 1906.
2 SHEETS—SHEET 1.
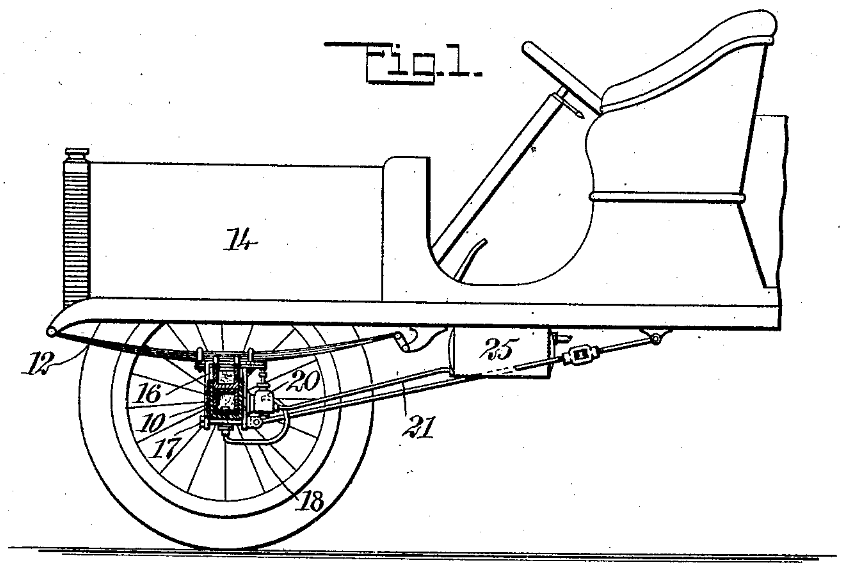
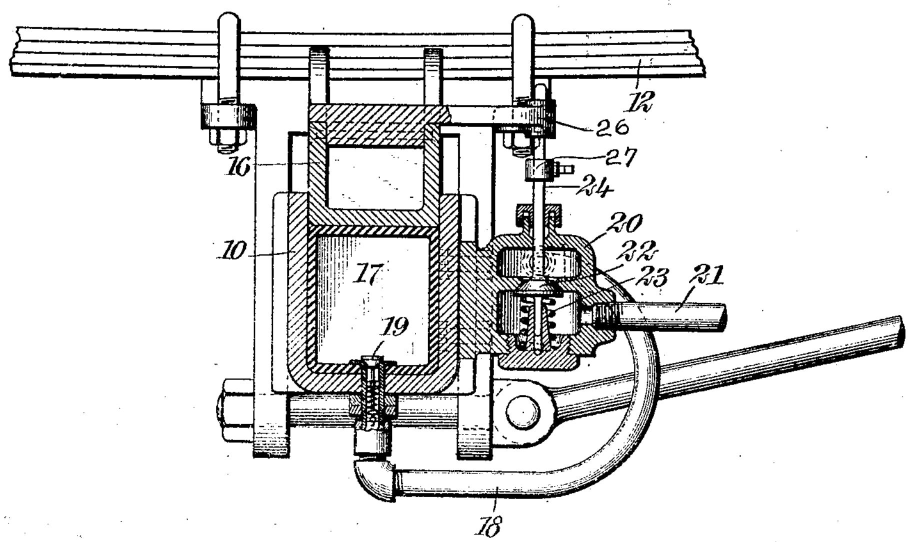
WITNESSES
L. Almquist
Isaac B. Owens.
INVENTOR
William E. Slater
BY Munn & Co
ATTORNEYS No. 870,254.
PATENTED NOV. 5, 1907.
W. E. SLATER.
SHOCK ABSORBER.
APPLICATION FILED MAY 31, 1906.
2 SHEETS—SHEET 2.
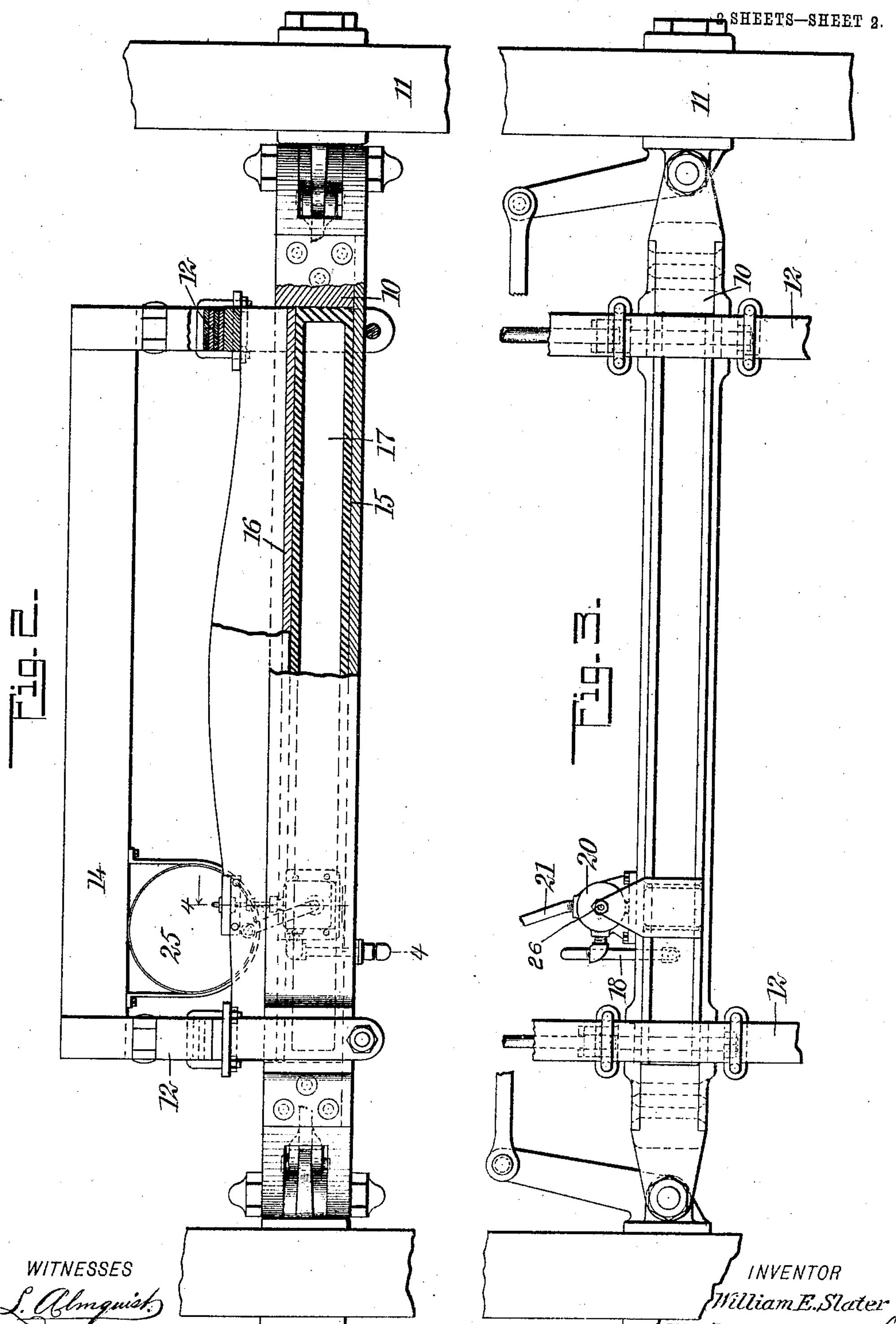
WITNESSES
L. Almquist
Isaac B. Owens
INVENTOR
William E. Slater
BY Munn & Co
ATTORNEYS

UNITED STATES PATENT OFFICE.

WILLIAM EDWARD SLATER, OF SAN FRANCISCO, CALIFORNIA.

SHOCK-ABSORBER.

No. 870,254. Specification of Letters Patent. Patented Nov. 5, 1907.

Application filed May 31, 1906. Serial No. 319,49C.

*To all whom it may concern:*

Be it known that I, WILLIAM E. SLATER, a citizen of the United States, and a resident of San Francisco, in the county of San Francisco and State of California, have invented a new and Improved Shock-Absorber, of which the following is a full, clear, and exact description.

My invention relates to a pneumatic shock absorber adapted particularly for use in connection with motor vehicles, but embodying principles applicable to other uses as will fully appear hereinafter.

In its preferred arrangement my invention embodies an axle having a cavity therein, in which is movably fitted a part in connection with the body of the motor vehicle, between the walls of which cavity and the said part is arranged a pneumatic cushion provided with a supply device automatically regulated by the movement of the vehicle body and its connections.

The invention resides in certain special features of construction and arrangement of parts, and all will be fully set forth hereinafter and particularly pointed out in the claims.

Reference is to be had to the accompanying drawings which illustrate as an example the preferred embodiment of my invention, in which drawings Figure 1 is a partial side view of a motor vehicle equipped with my improvement; Fig. 2 is a partial front view thereof with parts of the axle broken away; Fig. 3 is a plan of the front axle and its connections; and Fig. 4 is an enlarged section on the line 4—4 of Fig. 2.

10 indicates the front axle of the vehicle, which carries the wheels 11 in the usual manner.

12 indicates the springs which support the body 14 on the axle. The axle is formed with a cavity 15, and in this cavity is vertically movable a bolster 16 in connection with the body 14 through the medium of the springs 12. Located in the cavity and sustaining the bolster 16 is a pneumatic cushion 17. This cushion resists the downward movement of the bolster and acts, therefore, to absorb the shock or jar ordinarily occasioned by the vertical movement of the body of the vehicle with respect to the axles thereof.

As shown best in Fig. 4, the pneumatic cushion 17 is supplied by a pipe 18 which discharges into the cushion and is commanded by a check valve 19. Said pipe 18 passes from a chamber 20, to which a pressure supply pipe 21 also leads. Communication between the pipes 21 and 18 is controlled by a valve 22 normally seated by a spring 23. The stem 24 of this valve projects up through the top of the casing 20 and through a bearing 26 carried by the bolster 16. Intermediate the ends of the valve stem is secured an adjustable collar 27 in position to be struck by the bearing 26 and thence effects connection with the body of the vehicle upon the descent thereof, so that as this descent takes place the valve 22 is opened and additional pressure from the pipe 21 is admitted to the cushion 17 through the pipe 18, thus stiffening said cushion and further resisting the descent of the body. The pipe 21 communicates with a supply reservoir 25, and this is adapted to be charged by a compressor of any suitable sort.

It will be seen, therefore, that the pneumatic cushion 17 sustains the body of the vehicle and supplements the action of the springs 12, and it will also be seen that the air pressure in this cushion is automatically regulated and controlled by the movement of the body on the axle.

Having thus described the preferred form of my invention, what I actually claim and desire to secure by Letters Patent is:

1. A vehicle having an axle and a bolster, one of which is provided with a cavity therein, and the other of which is provided with a part movable within said cavity, a pneumatic cushion located in the cavity and sustaining the bolster, and means for automatically controlling the application of pressure to said cushion.

2. A vehicle having an axle with a cavity therein, a bolster having connection with the vehicle body and provided with a part movable in the cavity, a pneumatic cushion located in the cavity and sustaining the bolster and its connections, and means for automatically controlling the application of pressure to said cushion.

3. A vehicle having an axle with a cavity therein, a bolster having connection with the vehicle body and provided with a part movable in the cavity, a pneumatic cushion located in the cavity and sustaining the bolster and its connections, a valve controlling the application of pressure to said cushion, and means for operating the valve upon the descent of the body.

4. A vehicle having an axle with a cavity therein, a bolster having connection with the vehicle body and having a part movable in the cavity, a pneumatic cushion located in the cavity and sustaining the bolster and its connections, a valve controlling the admission of pressure to said cushion, a valve stem for said valve, and means carried by said bolster and coöperating with said valve stem for opening the valve upon the descent of the body.

5. A vehicle having an axle with a cavity therein, a bolster having a part movable in the cavity, springs secured to said bolster, a body supported upon said springs, a pneumatic cushion located in the cavity and sustaining the bolster and its connecting parts, a source of fluid pressure supply, a conduit leading from said source to the pneumatic cushion, a valve in said conduit, and means for opening said valve upon the descent of the body.

In testimony whereof I have signed my name to this specification in the presence of two subscribing witnesses.

WILLIAM EDWARD SLATER.

Witnesses:

HUGO A. HORNLEIN,

ROBERT A. McLEAN.